US012560492B2

(12) United States Patent
Bleifuß et al.

(10) Patent No.: US 12,560,492 B2
(45) Date of Patent: Feb. 24, 2026

(54) TEMPERATURE-SENSOR ASSEMBLY AND METHOD FOR PRODUCING A TEMPERATURE SENSOR ASSEMBLY

(71) Applicant: Yageo Nexensos GmbH, Kleinostheim (DE)

(72) Inventors: Martin Bleifuß, Kleinostheim (DE); Stephan Urfels, Kleinostheim (DE); Karlheinz Wienand, Aschaffenburg (DE)

(73) Assignee: Yageo Nexensos GmbH, Kleinostheim (DE)

( * ) Notice: Subject to any disclaimer, the term of this patent is extended or adjusted under 35 U.S.C. 154(b) by 733 days.

(21) Appl. No.: 17/905,227

(22) PCT Filed: Feb. 9, 2021

(86) PCT No.: PCT/EP2021/053078
§ 371 (c)(1),
(2) Date: Aug. 29, 2022

(87) PCT Pub. No.: WO2021/175542
PCT Pub. Date: Sep. 10, 2021

(65) Prior Publication Data
US 2023/0113930 A1      Apr. 13, 2023

(30) Foreign Application Priority Data
Mar. 4, 2020      (DE) ..................... 20 2020 101 197.9

(51) Int. Cl.
*G01K 7/18*      (2006.01)
*G01K 1/14*      (2021.01)

(52) U.S. Cl.
CPC ............... *G01K 7/186* (2013.01); *G01K 1/14* (2013.01)

(58) Field of Classification Search
CPC ................................. G01K 7/186; G01K 1/14
USPC ........................................................... 374/185
See application file for complete search history.

(56) References Cited

U.S. PATENT DOCUMENTS

| | | | |
|---|---|---|---|
| 4,309,688 A | 1/1982 | Kempe | |
| 5,430,428 A * | 7/1995 | Gerblinger | ............. H01C 7/021 |
| | | | 374/185 |
| 9,040,338 B2 | 5/2015 | Eisele | |
| 10,788,377 B2 | 9/2020 | Ihle et al. | |
| 10,861,624 B2 * | 12/2020 | Strallhofer | ............. H01C 7/008 |
| 2012/0061815 A1 | 3/2012 | Sontheimer et al. | |
| 2018/0252591 A1 | 9/2018 | Varfolomeeva et al. | |

FOREIGN PATENT DOCUMENTS

| | | |
|---|---|---|
| DE | 19830821 | 2/1999 |
| DE | 102010050315 A1 | 5/2012 |
| DE | 102014110553 A1 | 1/2016 |

* cited by examiner

*Primary Examiner* — Kristina M Deherrera
(74) *Attorney, Agent, or Firm* — Dicke, Billig & Czaja, PLLC

(57) ABSTRACT
A temperature-sensor assembly comprising at least one temperature sensor and at least one supply line, wherein the temperature sensor has at least one electrically insulating substrate with an upper side and an underside, wherein a temperature-sensor structure with at least one sensor-contact surface is formed at least on parts of the upper side, wherein the supply line has at least one supply-line contact surface, wherein the supply-line contact surface is connected to the sensor-contact surface at least in part by means of a first sinter layer.

14 Claims, 2 Drawing Sheets

TEMPERATURE-SENSOR ASSEMBLY AND METHOD FOR PRODUCING A TEMPERATURE SENSOR ASSEMBLY

The present invention relates to a temperature-sensor assembly comprising at least one temperature sensor and at least one supply line. Furthermore, the invention relates to a method for producing a temperature-sensor assembly.

It is known to connect temperature sensors to further components by means of a wide variety of connection methods. Since the dimensions of corresponding sensors are becoming increasingly smaller, the contacting of such temperature sensors is increasingly associated with corresponding difficulties.

Contacting contact surfaces of a temperature sensor on the upper side usually takes place by wire bonding, soldering, or sintering. Since the contact surface of the temperature sensors are becoming increasingly smaller, reliable electrical contacting of these contact surfaces can be achieved only with difficulty.

It is therefore an object of the present invention to provide an improved temperature-sensor assembly which can be easily assembled and contacted. A further object of the invention is to specify a method for producing such an improved temperature-sensor assembly.

This object is achieved according to the invention by a temperature-sensor assembly according to the subject matter of claim 1. With regard to a method for producing a temperature-sensor assembly, the object is achieved according to claim 14.

In particular, the object is achieved by a temperature-sensor assembly comprising at least one temperature sensor and at least one supply line. The temperature sensor comprises at least one electrically insulating substrate with an upper side and an underside. A temperature-sensor structure with at least one sensor-contact surface is formed at least on parts of the upper side. The supply line of the temperature-sensor assembly comprises at least one supply-line contact surface, wherein the supply-line surface is connected to the sensor-contact surface at least in part by means of a first sinter layer.

A component that serves as an electrically insulating carrier material for the temperature-sensor structure can be understood as a substrate. The surfaces of the upper side of the substrate and of the underside of the substrate can be substantially planar.

In particular, a structure that is adapted to directly or indirectly detect a temperature value is to be understood as a temperature-sensor structure. For example, the temperature-sensor structure can be a resistance network that is vapor-deposited onto the substrate.

The at least one sensor-contact surface is used to contact the temperature-sensor structure. The at least one sensor-contact surface can be formed from conductive material. It is possible for the sensor-contact surface to be formed from the same material as the temperature-sensor structure.

For example, the at least one sensor-contact surface can be formed at one end of the temperature-sensor structure. In a preferred embodiment of the invention, the temperature sensor comprises two sensor-contact surfaces. In this case, the sensor-contact surfaces can each be formed at one end of the temperature-sensor structure in order to measure an electrical resistance between the two sensor-contact surfaces.

Since the temperature-sensor assembly comprises a supply line that is already connected to the at least one sensor-contact surface, the temperature-sensor assembly can be easily handled in this form as an intermediate product. Furthermore, the contacting of the temperature-sensor assembly, for example on a printed circuit board, is relatively simple since the small sensor-contact surface is already contacted.

For this purpose, the supply line comprises at least one supply-line contact surface, wherein the supply-line contact surface is connected to the sensor-contact surface at least in part by means of a first sinter layer.

A layer that already produces a complete connection between the supply-line contact surface and the sensor-contact surface is in particular to be understood as a sinter layer. This complete connection relates both to a mechanical connection and to an electrical connection or contacting. In other words, the sinter layer is preferably an already sintered layer.

The first sinter layer is preferably formed from a first pre-applied sinter-paste layer, which is applied to the supply-line contact surface and/or the sensor-contact surface. A pre-applied sinter-paste layer is a layer that is still reactive. In other words, a pre-applied sinter-paste layer has at least residual reactivity. Accordingly, a sinter layer is formed from a pre-applied sinter-paste layer by pressure and/or temperature application.

In the following, a distinction is preferably made between the terms "sinter layer" and "pre-applied sinter-paste layer." A pre-applied sinter-paste layer is a sinter layer that has at least not yet been completely produced. A pre-applied sinter-paste layer has at least residual reactivity for a subsequent sintering process and/or connection process.

The supply line of the temperature-sensor assembly is preferably flexible. Such a flexible design has the advantage that the connection of the temperature sensor to a further component can be carried out easily since the supply line can, for example, be bent in such a way that a connection of a further supply-line contact surface to a further component is possible independently of the actual positioning of the further component.

In one embodiment of the invention, the supply line is formed from a metal strip and/or a metal wire. The metal strip and/or the metal wire preferably comprises at least one flattened end. The flattened end preferably forms the supply-line contact surface of the supply line.

Furthermore, the supply line can be a metal-coated polymer substrate and/or a metal sheet. The metal sheet is in particular punched or lasered or etched.

In a further embodiment of the invention, it is possible for the temperature-sensor assembly to comprise a supply-line carrier. At least one supply line can be applied to the supply-line carrier. Preferably, a plurality of supply lines is formed on the supply-line carrier. In particular in such an embodiment of the invention with a supply-line carrier, the at least one supply line can be formed from a paste, in particular a silver paste. The supply-line carrier can be formed, for example, from a film, in particular a polyimide film. With the aid of a supply-line carrier, it is possible to already correctly position at least one supply line in a preparatory assembly step.

In a further embodiment of the invention, the temperature-sensor structure is formed as a resistance element. As already described, an electrical resistance between preferably two sensor-contact surfaces formed can be measured with the aid of such a temperature-sensor structure or resistance structure.

In a particularly preferred embodiment of the invention, the temperature-sensor structure and/or the at least one sensor-contact surface comprise platinum material. It is possible for the temperature-sensor structure or the at least one sensor-contact surface to be formed from platinum material. It is particularly preferred for both the temperature-sensor structure and the at least one sensor-contact surface to be formed from platinum. It is possible for a platinum alloy to be used instead of a platinum material.

Preferably, when at least two sensor-contact surfaces are formed, both contact surfaces are formed on the upper side of the substrate. This serves to improve the contactability of the sensor-contact surfaces. Alternatively, it is possible for one of the contact surfaces to also be formed on a different side of the substrate.

In one embodiment of the invention, the temperature-sensor assembly comprises at least one passivation layer which is formed at least on parts of the temperature-sensor structure and/or, preferably over the entire surface, on the upper side of the substrate. Advantageously, a greatly reduced reaction capacity at the surface of the temperature-sensor structure can be achieved by forming a passivation layer. In other words, the surface of the temperature-sensor structure is protected, in particular against corrosion, by the passivation layer. Thus, due to the reduced reaction capacity at the surface of the temperature-sensor structure, the temperature-sensor element can be operated with high accuracy over long periods of time.

For example, the passivation layer can comprise at least one polyimide material or one glass material and/or one ceramic material and/or one glass-ceramic material. In further embodiments of the invention, the passivation layer consists of a polyimide material or a glass material and/or a ceramic material and/or a glass-ceramic material.

The substrate preferably comprises a ceramic insulating material, in particular aluminum oxide and/or aluminum nitride and/or silicon nitride. Furthermore, it is possible for the substrate to comprise a glass sandwich material.

In a further embodiment of the invention, it is possible for the substrate to comprise a printed circuit board material.

Ceramic insulating materials advantageously offer a combination of good mechanical, chemical, thermal, and electrical properties.

A metallization layer can be formed on the underside of the substrate. The metallization layer preferably comprises a silver material and/or a gold material and/or a metal alloy. It has been found that these metals form particularly good metallization layers in connection with temperature sensors.

A second sinter layer and/or a second sinter-paste layer can be formed on the metallization layer or on the underside of the substrate. A second sinter layer is present if a pre-applied sinter-paste layer has already been subjected to heat application and/or pressure application in a targeted manner. In connection with the second sinter layer and/or second sinter-paste layer, reference is made to the above explanations in connection with the first sinter layer and/or first sinter-paste layer.

The second sinter layer is preferably formed from a pre-applied sinter-paste layer.

The second sinter layer and/or the second sinter-paste layer can in turn be part of an intermediate product, according to which a temperature-sensor assembly is initially produced to this extent, is transported to a customer, and subsequently installed appropriately at the customer.

The second sinter layer and/or the second sinter-paste layer is used in particular to attach and contact the temperature sensor to a printed circuit board.

It should be pointed out that the sinter layer or pre-applied sinter-paste layer that produces a connection between a supply line and the temperature sensor is always to be understood in the following as the first sinter layer or first pre-applied sinter-paste layer.

The sinter layer or pre-applied sinter-paste layer that produces a connection between the sensor and a further component, in particular a component carrier, is to be understood as the second sinter layer or as the second pre-applied sinter-paste layer.

The terms "first" and "second" do not make any statement as to which of the sinter layers/pre-applied sinter-paste layers are applied first or second.

The first sinter layer can also be referred to as upper sinter layer. The first pre-applied sinter-paste layer can also be referred to as upper pre-applied sinter-paste layer. The second sinter layer can also be referred to as lower sinter layer. The second pre-applied sinter-paste layer can also be referred to as lower pre-applied sinter-paste layer.

The first sinter layer and/or the second sinter layer and/or the first pre-applied sinter-paste layer and/or the second pre-applied sinter-paste layer preferably comprises metal particles, in particular noble metal particles, particularly preferably silver particles and/or gold particles and/or platinum particles.

In other words, the sinter paste necessary for producing the first and/or second pre-applied sinter-paste layer can comprise metal particles, in particular noble metal particles, particularly preferably silver particles and/or gold particles and/or platinum particles. The sinter paste can be applied, for example, by means of stencil printing and/or screen printing and/or jet printing and/or dispensing and/or transfer printing.

The application of the sinter paste to the supply-line contact surface and/or the sensor-contact surface and/or the metallization layer and/or to the underside of the substrate can take place with a predetermined structure. In particular, the structure can be applied precisely to the structure of the substrate and/or the temperature-sensor structure. The sinter paste can be pre-applied with such a shape by means of the techniques mentioned.

Due to the temperature-sensor assembly according to the invention, a temperature-sensor assembly that is easy to transport on the one hand and is easily applied and/or connected to further components on the other hand can be provided. This relates to both the mechanical and the electrical connection.

The at least one sensor-contact surface is electrically connected to the temperature-sensor structure. The supply-line contact surface of the supply line is in turn electrically connected to the supply line.

The term "sinter" generally describes a method for producing or modifying materials. In this case, fine-grained ceramic or metal materials are heated, often under elevated pressure, wherein the temperatures remain below the melting temperature of the main components. Accordingly, the form or shape of the workpiece is preserved.

Preferably, the sinter paste is dried before the sintering process. During the sintering process, the elements or sections to be connected are positioned and then connected to one another with or without pressure and optionally at elevated temperature.

In terms of production technology, it is advantageous to apply the sinter paste, prior to assembly, to at least one of the surface to be connected. The sinter paste is applied to the surface and pre-dried. This step of applying and pre-drying is also referred to as pre-application. This has the advantage that initially no printing and drying process of the sinter paste has to take place with regard to the connection of the surfaces. The subsequent handling of the component during assembly is simplified since a pre-applied sinter-paste layer no longer adheres.

After positioning the temperature-sensor assembly on the component actually to be connected, in particular on the printed circuit board to be connected, the final sintered connection, i.e., the actual sinter layer, can be produced by means of a temperature-controllable stamp which presses onto the component to be connected.

Alternatively, it is possible that, instead of a sinter layer or pre-applied sinter-paste layer, a different connecting layer is applied to the underside of the substrate or to the metallization layer in order to connect the substrate or the temperature sensor to a further component, in particular a printed circuit board. For example, it is possible for the temperature sensor to be connected to a further component, in particular a printed circuit board, by means of an adhesive layer. Suitable adhesive layers are, for example, layers that comprise a reactive adhesive. The reactive adhesive can, for example, be epoxy adhesive and/or cyanoacrylate adhesive.

Particularly preferably, the supply line is formed from a flat material, in particular a flat metal strip. The formation of a flat supply line has the advantage that such supply lines are already used in the manufacture of power electronic boards (PEBs). Flat supply lines comprise a large current-density-carrying capacity with a simultaneously low generation of induction fields. It is accordingly possible to use the same supply lines as are used in the connection of power-semiconductor elements, when a temperature sensor is integrated in a power electronic board. This considerably simplifies the manufacturing process.

The further preferred embodiment of the invention comprises a supply line made of a metal-coated polymer substrate. This can be a metallized polyimide film. Such metallized polyimide films are particularly advantageous since they are used in particular in the field of low-power electronics and are particularly suitable for contacting temperature sensors. Metallized polyimide films are particularly cost-effective, can be applied directly from a storage roll, and are extremely flexible.

The formation of a flat supply line also has the advantage that a flat construction can be formed on the upper side of the temperature-sensor assembly. Due to the formation of flat supply lines and thus of a flat supply-line contact surface, these supply lines and the surfaces of the temperature sensor are approximately in one plane. As a result, the thermal contact between the temperature sensor and a heat sink pressed against the surface is increased. In this way, double-sided cooling of a power electronic board can be realized. In other words, the substrate can be connected to a heat sink both on its upper side and on its underside.

A further aspect of the invention relates a method for producing a temperature-sensor assembly according to the invention.

The method according to the invention is in principle based on the following method steps of:

providing a temperature sensor comprising at least one electrically insulating substrate with an upper side and an underside, wherein a temperature-sensor structure with at least one sensor-contact surface is formed at least on parts of the upper side, providing a supply line comprising at least one supply-line contact surface, applying a sinter paste to the sensor-contact surface and/or the supply-line contact surface, forming at least a first pre-applied sinter-paste layer, connecting the supply line to the temperature sensor by forming a sinter layer through a sintering process.

The temperature-sensor assembly according to the invention can be produced and/or further used with the aid of the following exemplary methods.

First Embodiment of a Production Method

In a first method step, sinter paste is applied to at least one sensor-contact surface. A first pre-applied sinter-paste layer is formed. Sinter paste is applied at least to parts of the underside of the substrate or of a metallization layer of the substrate. A second pre-applied sinter-paste layer is formed.

Subsequently, the temperature sensor is connected by means of pressure sintering with the second pre-applied sinter-paste layer to a further component and the sensor-contact surface is connected to a supply-line contact surface of a supply line. The pressure-sintering processes with regard to the supply line to be connected and with regard to the further component to be connected can take place simultaneously or successively.

If, according to a first variant, the temperature sensor is initially connected to a further component, it must be ensured in the first pressure-sintering process that a temperature-controllable stamp does not act on the first pre-applied sinter-paste layer. Subsequently, the at least one supply line is positioned with the supply-line contact surface in relation to the sensor-contact surface of the temperature sensor and is connected by a pressure-sintering process.

Second Embodiment of a Production Method

In a first step, a sinter-paste layer is applied to the underside of the substrate or to the metallization layer. Initially, the second pre-applied sinter-paste layer is formed. Subsequently, the temperature sensor is connected by means of the pre-applied sinter-paste layer to a further component.

Subsequently, a sinter paste is applied at least to parts of the at least one sensor-contact surface and/or of the at least one supply-line contact surface. The first pre-applied sinter-paste layer is formed.

Subsequently, the supply-line contact surface is positioned in relation to the sensor-contact surface. This is followed by a sintering process in which the supply-line contact surface is connected to the sensor-contact surface by means of the first pre-applied sinter-paste layer. In this respect, a temperature-controllable stamp is preferably used, which presses the supply line, in particular the supply-line contact surface, onto the temperature sensor, in particular onto the sensor-contact surface.

Third Embodiment of a Production Method

In a first step, a first pre-applied sinter-paste layer is formed. For this purpose, a sinter paste is applied to at least one sensor-contact surface and/or to at least one supply-line contact surface of a supply line.

The temperature sensor is subsequently connected to a further component. For this purpose, the temperature sensor is connected on the underside of the substrate or on the metallization layer to the at least one further component. It is possible for this connection to be formed by means of an adhesive layer and/or solder layer and/or sinter layer.

Subsequently, the supply line is connected to the temperature sensor. For this purpose, the first sinter layer is formed between the at least one supply-line contact surface and the at least one sensor-contact surface through a sintering process.

Fourth Embodiment of a Production Method

In a first step, a first sinter paste is applied to the at least one supply-line contact surface of at least one supply line and the first pre-applied sinter-paste layer is formed.

Subsequently or previously or simultaneously, the temperature sensor is connected to a further component, in particular a component carrier. For this purpose, the underside of the substrate or the metallization layer of the temperature sensor is connected to the further component, in particular the component carrier. This connection preferably takes place by forming a second sinter layer between the temperature sensor and the further component, in particular the component carrier.

Further features and advantages of the invention become apparent from the description below.

The invention is explained in more detail below using exemplary embodiments with reference to the accompanying drawings.

In the following, the same reference signs are used for identical and identically acting components.

Figure 1:
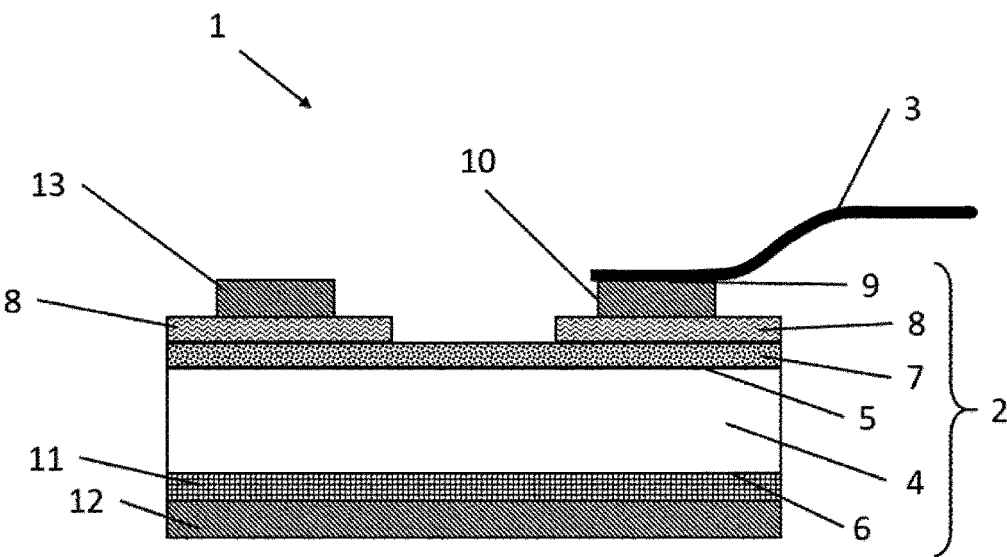
FIG. 1 shows a first embodiment of a temperature-sensor assembly according to the invention.

FIG. 1 shows a first embodiment of a temperature-sensor assembly 1 according to the invention. Said temperature-sensor assembly essentially comprises a temperature sensor 2 and at least one supply line 3. The temperature sensor 2 comprises an electrically insulating substrate 4 with an upper side 5 and an underside 6. A temperature-sensor structure 7 is formed at least on parts of the upper side 5 of the substrate 4.

Two sensor-contact surfaces 8 can likewise be seen. The temperature-sensor structure 7 and the sensor-contact surfaces 8 are preferably formed from the same material. Particularly preferably, they are formed from a platinum material.

The supply line 3 is flexible. In the example shown, the supply line 3 is formed from a flat metal strip. It is possible for the supply line 3 to be formed from a metal-coated polymer substrate. The front end of the supply line 3 comprises a supply-line contact surface 9. The supply-line contact surface 9 is preferably the section of the supply line 3 that is to be connected to the sensor-contact surface 8. One of the sensor-contact surfaces 8 is connected to the illustrated supply-line contact surface 9 of the supply line 3 by means of a first sinter layer 10. FIG. 1 shows only one supply line 3. The further sensor-contact surface 8 is preferably likewise connected to a supply line 3 in a later method step (not shown). In this respect, a first pre-applied sinter-paste layer 13 is already formed. The difference between the first sinter layer 10 and the first pre-applied sinter-paste layer 13 is that the first pre-applied sinter-paste layer 13 has residual reactivity in order to enable a connection to the supply line 3, in particular the supply-line contact surface 9. Once the sintering process is complete, a first sinter layer 10 is formed, as is already shown in FIG. 1.

In the example shown, the temperature sensor 2 comprises a metallization layer on the underside 6 of the substrate 4. The metallization layer 11 preferably comprises a silver material and/or a gold material and/or a metal alloy. A second pre-applied sinter-paste layer 12 is in turn applied to the metallization layer 11. This second pre-applied sinter-paste layer 12 is used to connect the temperature-sensor assembly 1 to a further component, in particular to a component carrier.

The temperature-sensor assembly 1 shown can be transported in this form as an intermediate product. For this purpose, a further supply line 3 could be applied to the first pre-applied sinter-paste layer 13.

In this form, the intermediate product can be transported to a customer. Since the layer 12 is a pre-applied sinter-paste layer, which has residual reactivity, the temperature-sensor assembly 1 can be easily connected to a further component (not shown), in particular to a component carrier.

Furthermore, it is possible for the supply line 3 to likewise comprise a supply-line contact surface on the second end (not shown). This further supply-line contact surface can already comprise a pre-applied sinter-paste layer. Furthermore, it is possible for the further end of the supply line to be connected to further components by means of a different connection technique.

The embodiment according to FIG. 2 essentially comprises the same elements or layers as have already been explained in connection with the embodiment according to FIG. 1.

It can be seen that neither a metallization layer nor a pre-applied sinter-paste layer is however applied to the underside 6 of the substrate 4.

Figure 2:
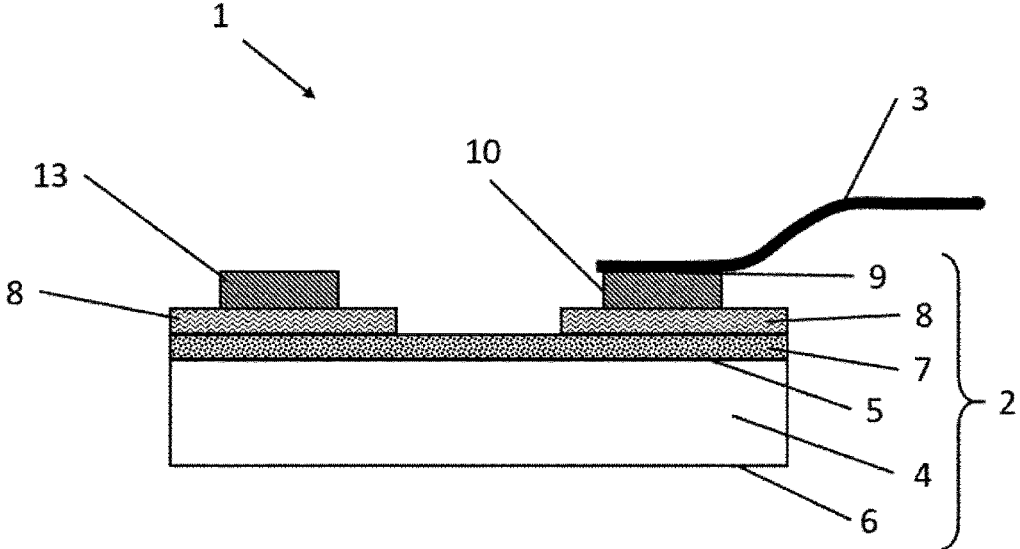
FIG. 2 shows a second embodiment of a temperature-sensor assembly according to the invention.

The temperature-sensor assembly 1 shown in FIG. 2 can also be transported as an intermediate product to a customer. The connection of the substrate 4 to a further component, in particular to a component carrier, can take place, for example, by means of an adhesive layer (not shown). Furthermore, it is possible for a pre-applied sinter-paste layer to be formed on the component to be connected, in particular on the component carrier, so that the underside 6 of the substrate 4 can be placed onto this pre-applied sinter-paste layer and subsequently connected thereto.

Figure 3:
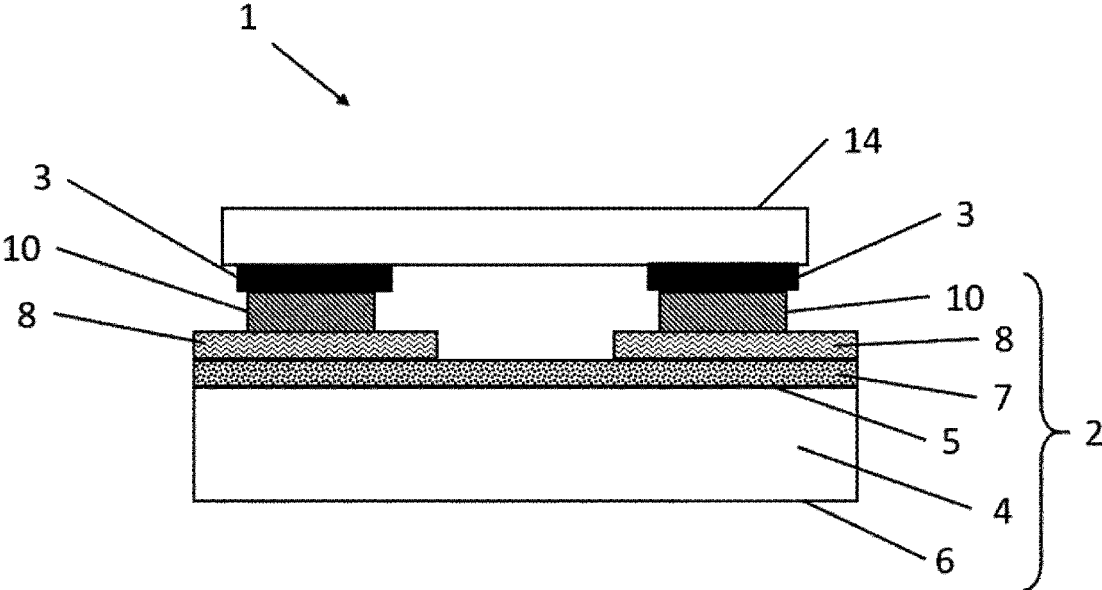
FIG. 3 shows a third embodiment of a temperature-sensor assembly according to the invention.

FIG. 3 shows a cross-section of a further embodiment of the temperature-sensor assembly 1.

The supply lines 3 are applied to a supply-line carrier 14. The supply-line carrier 14 can consist e.g. of a polyimide film, and the supply lines 3 can consist e.g. of strips of a printed Ag paste. The supply lines 3 are connected to the sensor-contact surfaces 8 via a first sinter layer 10.

The first sinter layer 10 is pre-applied to the supply lines 3 and/or the sensor-contact surfaces 8 prior to the joining.

LIST OF REFERENCE SIGNS

1 Temperature-sensor assembly
2 Temperature sensor
3 Supply line
4 Substrate
5 Upper side
6 Underside
7 Temperature-sensor structure
8 Sensor-contact surface
9 Supply-line contact surface
10 First sinter layer
11 Metallization layer
12 Second pre-applied sinter-paste layer
13 First pre-applied sinter-paste layer
14 Supply-line carrier

The invention claimed is:

1. A temperature-sensor assembly, comprising at least one temperature sensor and at least one supply line, wherein the at least one temperature sensor comprises at least one electrically insulating substrate with an upper side and an underside, wherein a temperature-sensor structure with at least one sensor-contact surface is formed at least on parts of the upper side, wherein the at least one supply line comprises at least one supply-line contact surface, wherein the at least one supply-line contact surface is connected to the at least one sensor-contact surface at least in part by means of a first sinter layer, wherein the first sinter layer is formed from a first pre-applied sinter-paste layer, which is applied to the supply-line contact surface or the sensor-contact surface.

2. The temperature-sensor assembly according to claim 1, wherein the supply line is flexible.

3. The temperature-sensor assembly according to claim 1, wherein the supply line is formed from a metal strip or a metal wire with at least one flattened end or a metal-coated polymer substrate or a metal sheet.

4. The temperature-sensor assembly according to claim 1, wherein the temperature-sensor structure is formed as a resistance element.

5. The temperature-sensor assembly according to claim 1, wherein the temperature-sensor structure and/or the sensor-contact surface comprises platinum material.

6. The temperature-sensor assembly according to claim 1, wherein at least one passivation layer which is formed at least on parts of the temperature-sensor structure or, on the upper side of the substrate.

7. The temperature-sensor assembly according to claim 6, wherein the passivation layer comprises a polyimide material and/or a glass material and/or a ceramic material and/or a glass-ceramic material.

8. The temperature-sensor assembly according to claim 1, wherein the substrate comprises a ceramic insulating material.

9. The temperature-sensor assembly according to claim 1, wherein a metallization layer is formed on the underside of the substrate.

10. The temperature-sensor assembly according to claim 9, wherein a second sinter layer and/or a second sinter-paste layer is formed on the underside of the substrate or on the metallization layer.

11. The temperature-sensor assembly according to claim 10, wherein the second sinter layer is formed from a second pre-applied sinter-paste layer.

12. The temperature-sensor assembly according to claim 1, wherein the first sinter layer or the second sinter layer or the first pre-applied sinter-paste layer or the second pre-applied sinter-paste layer comprise(s) metal particles.

13. A method for producing a temperature-sensor assembly according to claim 1, comprising at least one temperature sensor and at least one supply line, the method comprising the steps of:

provided a temperature sensor comprising at least one electrically insulating substrate with an upper side and an underside, wherein a temperature-sensor structure with at least one sensor-contact surface is formed at least on parts of the upper side;

providing a supply line comprising at least one supply-line contact surface;

applying a sinter paste to the sensor-contact surface and/or the supply-line contact surface;

forming at least a first pre-applied sinter-paste layer; and, connecting the supply line to the temperature sensor by forming a sinter layer through a sintering process.

14. The method according to claim 13, wherein:

applying a sinter paste at least to parts of the underside of the substrate or of a metallization layer of the substrate;

forming a second pre-applied sinter-paste layer; and, connecting the temperature sensor by means of pressure sintering with the second pre-applied sinter-paste layer to a further component.

* * * * *